United States Patent
Carini et al.

(10) Patent No.: US 9,696,437 B2
(45) Date of Patent: Jul. 4, 2017

(54) CHARGE CLOUD TRACKER: HIGH-RESOLUTION, HIGH DQE, PHOTON-COUNTING, ENERGY DISCRIMINATING X-RAY DETECTOR

(71) Applicant: The Board of Trustees of the Leland Stanford Junior University, Palo Alto, CA (US)

(72) Inventors: Gabriella Carini, San Carlos, CA (US); Sven Herrmann, San Carlos, CA (US); Rebecca Fahrig, Moehrendorf (DE)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/928,791

(22) Filed: Oct. 30, 2015

(65) Prior Publication Data

US 2016/0124096 A1    May 5, 2016

Related U.S. Application Data

(60) Provisional application No. 62/073,732, filed on Oct. 31, 2014.

(51) Int. Cl.
*G01T 1/24* (2006.01)
*G01T 1/29* (2006.01)

(52) U.S. Cl.
CPC .......... *G01T 1/2914* (2013.01); *G01T 1/2928* (2013.01)

(58) Field of Classification Search
CPC .. G01T 1/2928; G01T 1/366; H01L 27/14676
See application file for complete search history.

(56) References Cited

U.S. PATENT DOCUMENTS

| 6,002,134 | A | 12/1999 | Lingren | |
| 6,037,595 | A * | 3/2000 | Lingren | G01T 1/241 |
| | | | | 250/370.01 |
| 6,207,958 | B1 * | 3/2001 | Giakos | G01T 1/185 |
| | | | | 250/374 |
| 8,063,380 | B2 | 11/2011 | Levin et al. | |

(Continued)

FOREIGN PATENT DOCUMENTS

WO    WO2013/012809    1/2013

OTHER PUBLICATIONS

Amorese et al., "Enhancing spatial resolution of soft x-ray CCD detectors by single-photon centroid determination", Oct. 8, 2014, arXiv:1410.1587v1.

(Continued)

*Primary Examiner* — Kiho Kim
(74) *Attorney, Agent, or Firm* — Lumen Patent Firm (57) ABSTRACT

Improved X-ray detectors are provided in a cross-strip geometry with better resolution than the electrode spacing. The basic idea is analog charge cloud reconstruction. An important practical aspect of this work is rotating the electrode pattern by about 45 degrees relative to the detector slab, which provides several performance benefits (equal length for all electrodes and greater ease of integration into vertical stacks etc.) that are expected to be especially relevant to achieve high performance from analog charge cloud reconstruction.

17 Claims, 5 Drawing Sheets

(56) References Cited

U.S. PATENT DOCUMENTS

| | | | | |
|---|---|---|---|---|
| 2004/0004189 A1* | 1/2004 | Brahme | .................... | G01T 1/24 250/370.08 |
| 2004/0022350 A1* | 2/2004 | Gregerson | ............. | A61B 6/032 378/15 |
| 2008/0191138 A1* | 8/2008 | Kastalsky | ............. | G01T 1/2018 250/361 R |

OTHER PUBLICATIONS

Baumbaugh et al., "Analysis of full charge reconstruction algorithms for X-ray pixelated detectors", 2011, SLAB-PUB-14975.

Momayezi et al., "Position resolution in a Ge-strip detector", 1999, proc. SPIE v3768.

Schubert et al., "Micrometre resolution of a charge integrating microstrip detector with single photon sensitivity", 2012, J. Synchrotron Rad. v19, pp. 359-365.

Takeda et al., "Development of double-sided silicon strip detectors (DSSD) for a Compton telescope", 2007, SLAC-PUB-12927.

\* cited by examiner

| | |
|---|---|
| 502 | 512 |
| 504 | 514 |
| 506 | 516 |
| 508 | 518 |

CHARGE CLOUD TRACKER: HIGH-RESOLUTION, HIGH DQE, PHOTON-COUNTING, ENERGY DISCRIMINATING X-RAY DETECTOR

CROSS REFERENCE TO RELATED APPLICATIONS

This application claims the benefit of U.S. provisional patent application 62/073,732, filed on Oct. 31, 2014, and hereby incorporated by reference in its entirety.

FIELD OF THE INVENTION

This invention relates to X-ray detectors.

BACKGROUND

It is often desirable to increase the resolution of X-ray detectors in order to provide more accurate medical imaging, and for many other applications as well. One detector approach that has been considered is to use a cross strip detector geometry, where the X-ray position is taken to be the intersection of the two electrodes having the largest signals from an X-ray detection event. However, this approach provides a spatial resolution of the electrode spacing, which may be too large for applications. Accordingly, it would be an advance in the art to provide improved X-ray detectors.

SUMMARY

In this work, improved X-ray detectors are provided in a cross-strip geometry with better resolution than the electrode spacing. The basic idea is analog charge cloud reconstruction. An important practical aspect of this work is rotating the electrode pattern by about 45 degrees relative to the detector slab, which provides several performance benefits (equal length for all electrodes and greater ease of integration into vertical stacks etc.) that are expected to be especially relevant to achieve high performance from analog charge reconstruction.

Charge Cloud Reconstruction can achieve ultra-high resolution. The present approach depends on high data transfer rates and computation power to provide the 2D location of every photoelectric interaction. This approach would have been inconceivable without recent improvements in ASICs, signal transfer bandwidth, and computing power.

Multiple detector layers can be used in combination with the microstrip geometry to provide high count rates that are necessary for high-quality in vivo pre-clinical and clinical imaging.

The basic detector unit is simple, leading to various advantages. The manufacturing of the detector itself uses standard semiconductor manufacturing approaches, and does not require bump bonding, through-silicon vias, on chip amplification, and/or other 3D structures. The complexity instead is shifted to the design and construction of the ASIC. The simplicity of the basic detector unit also renders it very radiation hard. Expected lifetime dose to flat panel x-ray and clinical CT detectors are 10 kRads and 1.3 MRads respectively. Recent investigations by others have shown that similar Si substrate and strip structures show no degradation in charge collection performance for doses as high as 3.7 MRads and other studies also show that the Si—$SiO_2$ layer maintains performance under irradiation.

Further considerations relating to spatial resolution, count rate, detection efficiency, detector area, charge readout and clinical significance follow.

Spatial Resolution is maximized when: 1. the majority of interactions in the semiconductor are photo-electric (see FIG. 1), 2. K- and L-shell photons are absorbed (very) locally or are of such low energy that the created charge is below the noise threshold (not true for CZT!) 3. x-ray photons are incident perpendicular to the detector, requiring a curved or piece-wise focused detector (see FIGS. 7A-B) The detector resolution is then limited by the size (in μm) of the initial charge cloud, by the noise floor of the readout electronics, and by the spacing of the microstrips.

From the literature, the MTF (modulation transfer function) for 1-mm-thick Si drops to 50% at 168 cycles/mm and 40 cycles/mm for 20 and 40 keV photons respectively. To achieve this limiting resolution, good signal-to-noise on each microstrip is required to the calculate charge cloud center of mass (CofM). For the Si work energy of 3.63 eV/e−, a 25 keV photon produces ~6900 e−. If the charge splits evenly between two strips, then an rms noise of 175 e− per strip produces CofM uncertainty of ($\sqrt{2}\times 175$ e−)/3459 e−=7% of interstrip distance, or ~3.5 μm for a 50 μm pitch.

Count Rate is fundamentally limited by the mobility of the charge carriers, the electric field across the sensor and the thickness of the semiconductor substrate. For the basic detector unit, the charge from each interaction must be distinguishable from the charge from a second, unrelated charge cloud. For a 500 μm-thick Si semiconductor, distinguishing two 200 μm-diameter charge clouds requires that they be separated in time by 70 ns if drift velocity is ~$2.8\times 10^9$ μm/s. Thus the limiting count rate in this example is 1/70 ns=14 Mcps per microstrip [not per unit area of detector!], provided the electronics is capable of processing this information fast enough.

Figure 6A:
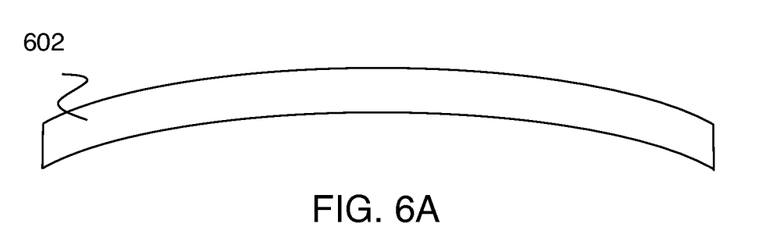
FIGS. 6A-B show two approaches for providing a curved detector geometry.
Figure 6B:
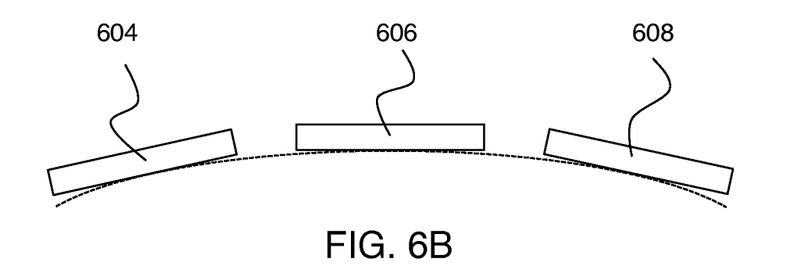

Quantum Detection Efficiency (QDE) is limited by sensor material and thickness, and the number of layers of the basic detector unit that are stacked together (see FIG. 6). Ideally, the thickness of each layer increases exponentially, so as to keep the photon interaction rate per layer constant.

Detector Area: The capacitance associated with each microstrip limits the geometry of the detector, since noise is linear with strip length, and noise ultimately limits resolution. We assume that inter-strip capacitance does not add crosstalk or parasitic voltage when ASIC design is good. A strip length of 1 cm generates an additional 120 e− of readout noise for a total noise of 175 e− (per the resolution example above).

Our Charge Readout approach uses asynchronous electronics. When charge arrives on a microstrip, the peak signal proportional to the charge is stored, as is the time at which the peak occurred. The readout circuit places this information into a readout buffer and after a short dead-time waits for the next signal. Each channel provides the time information with a resolution that enables coincidence measurements of the neighboring (and opposite layer) strips at the targeted photon rate.

Clinical Significance: The goal of 5 micron resolution was set by our desire to optimize an imaging system for both propagation-based and grating-based x-ray phase contrast imaging (PCI) in order to permit evaluation of the true capabilities of this emerging imaging approach. Unfortunately, the achievable quantum efficiency of high-resolution, fast detectors does not meet the needs of this very demanding imaging task. We predict a much improved MTF (50% MTF at 100 lp/mm at 25 keV) and hope to achieve high DQE, although overall DQE is difficult to estimate. Grating-based PCI would also be enabled by this detector. Current clinical setups (e.g. for mammography) use three gratings. Conventionally, one of these gratings must be stepped with high precision at least 4 times, with one image acquired per step, in order to measure absorption, phase and dark field (microstructure) of an object. With a 5-µm-resolution detector, a clinically feasible geometry can be achieved that requires no phase stepping. Thus a single exposure provides all three images, and the x-ray dose efficiency is ~twice that of a standard 3-grating system.

There are also other applications that would benefit from a fast, photon-counting, energy discriminating detector. Mammography and mammographic CT (computed tomography) could use the high resolution of the detector for oversampling, to improve the reconstruction of high-contrast micro-calcifications as well as enable the application of appropriate noise-reduction filters. The detector geometry is naturally that of a strip, and is thus particularly well suited to computed tomography, although a stepped (non-planar) detector geometry or a scanning-slot geometry could be used to provide area coverage. The energy-discriminating function of the detector would also be well suited to k- and l-fluorescence imaging, which may provide enhanced sensitivity to Au and Pt nanoparticles that are preferentially taken up in tumors. The detector would also be well suited to inverse-geometry systems, which have large-area distributed x-ray sources paired to small-area detectors.

DETAILED DESCRIPTION

Figure 1:
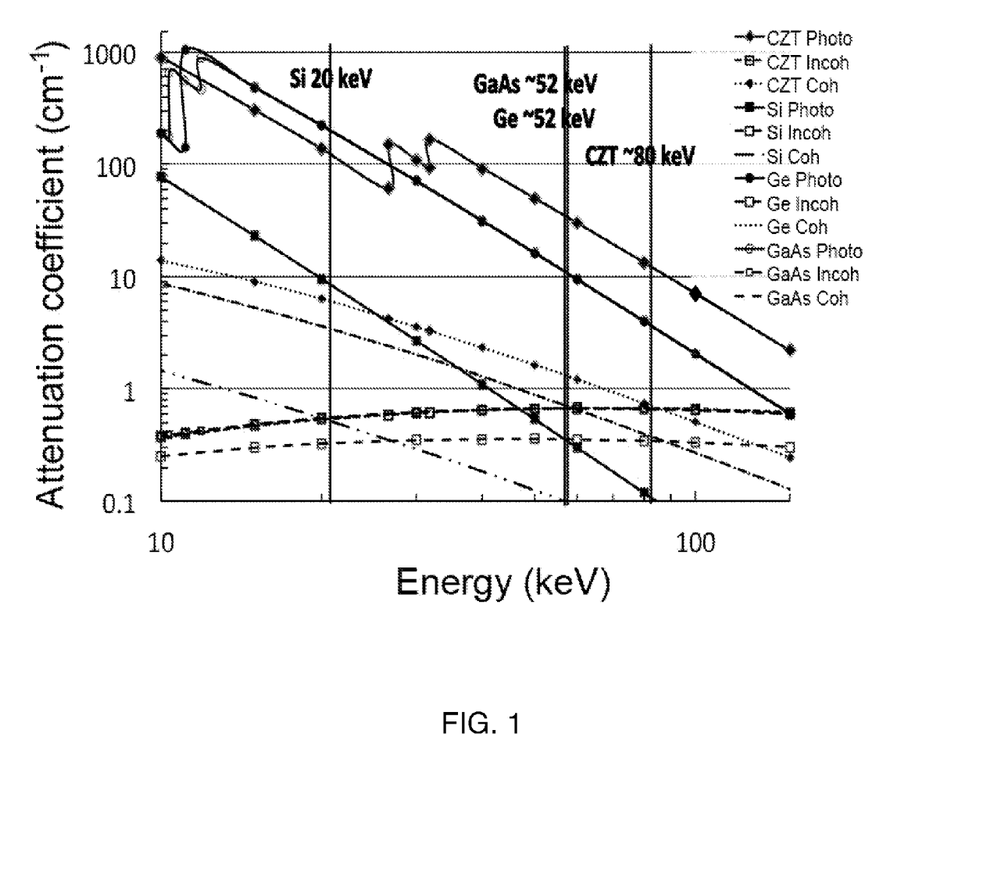
FIG. 1 shows attenuation vs. energy for several X-ray detector materials.

To better appreciate the present approach, it is helpful to consider the comparative performance of several X-ray detector materials. FIG. 1 shows attenuation vs. energy for several X-ray detector materials. The vertical lines indicate the photon energies, for each material, below which the sum of incoherent and Compton interactions make up less than 10% of the total interactions. To achieve highest resolution, we assume that photoelectric interactions dominate in the bulk material, and that K- and L-shell photons are absorbed locally or are below the noise floor. Note that CZT (Cadmium zinc telluride) does not satisfy the second requirement because fluorescent photons travel farther than the original charge cloud size. Accordingly, suitable detector materials for practicing the invention include, but are not limited to silicon, germanium and gallium arsenide. The examples given below consider silicon as the detector material. Other semiconductors including Ge and GaAs can be used. Photoelectric interactions dominate in these detectors at energies as high as 90 keV, and so the same basic detector unit implemented using one of these materials might be more appropriate for human clinical applications at higher energies.

Figure 2A:
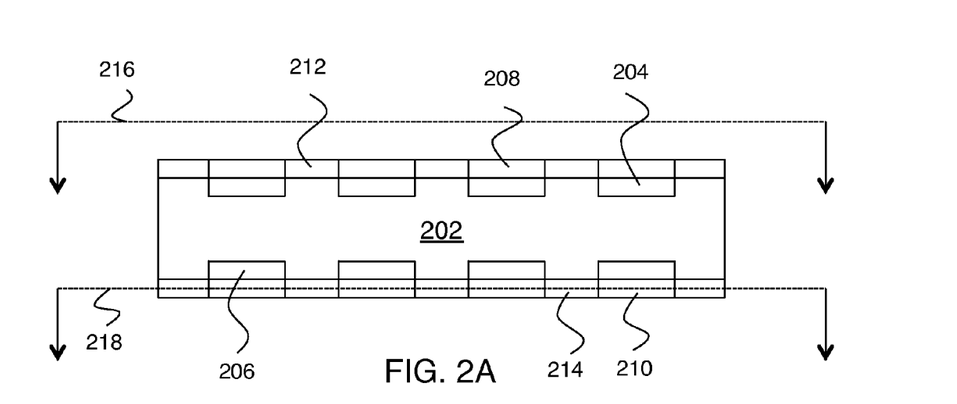
FIGS. 2A-C show an embodiment of the invention.
Figure 2B:
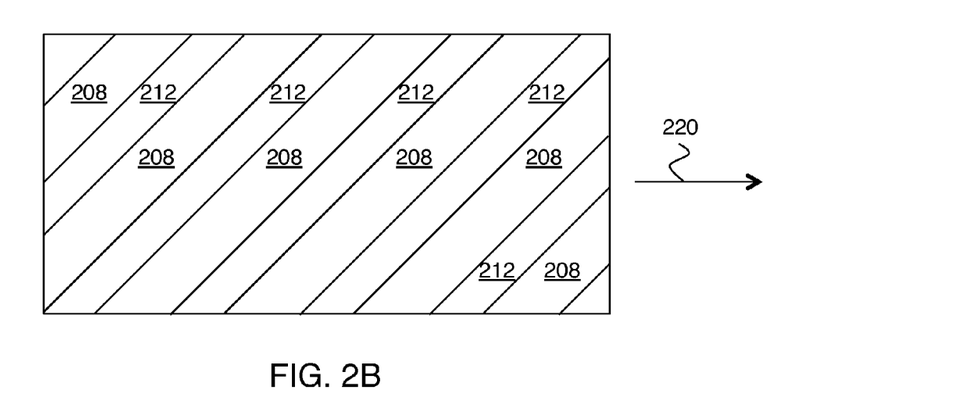
Figure 2C:
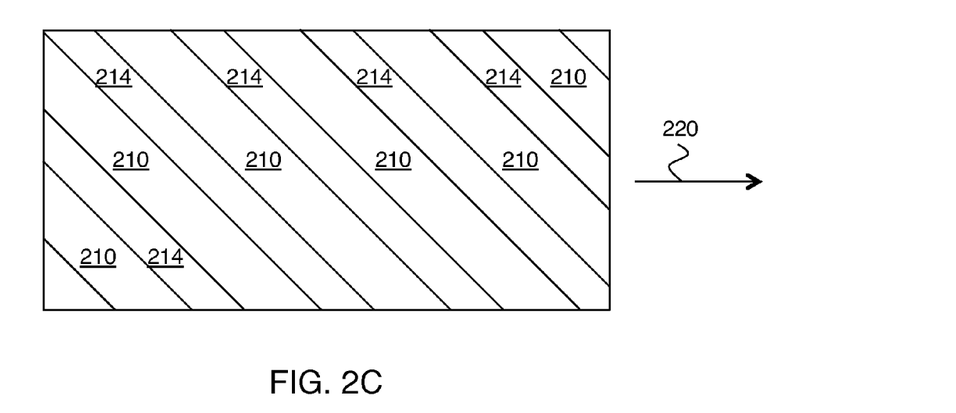

As indicated above, the basic detector geometry in the present work is a cross-strip detector with the electrode strips at roughly a 45 degree angle with respect to the detector slab. FIGS. 2A-C show an example. Here 202 is the semiconductor detector material, which can be undoped or have n– or p– doping. FIG. 2A is a side view, FIG. 2B is a top view as indicated by line 216 and FIG. 2C is a cross section view as indicated by line 218. Strip electrodes are formed in slab 202 by p+ regions 204 and/or n+ regions 206. Alternatively, regions 204 can have n+ doping and/or regions 206 can have p+ doping. Additional doping is required in one of the two sides depending on the detector material and doping. These regions are covered by first microstrip electrodes 208 (hereinafter 'top electrodes' 208) and second microstrip electrodes 210 (hereinafter 'bottom electrodes' 210) respectively. Space between top electrodes 208 can be filled in by insulator 212. Similarly, space between bottom electrodes 210 can be filled in by insulator 214. The preceding description relating to doping applies to the case of a silicon detector. Other detector materials may not need such doping.

It is convenient to refer to the length, width and height of slab 202 of detector material. Slab 202 is configured to be electrically biased across its height. Top electrodes 208 and bottom electrodes 210 are separated by the height of the semiconductor slab.

As shown, top electrodes 208 are parallel to each other. Similarly, bottom electrodes 210 are also parallel to each other. Top electrodes 208 are substantially orthogonal to bottom electrodes 210. Preferably top electrodes 208 and bottom electrodes 210 are disposed at an angle relative to each other between about 80 degrees and about 100 degrees.

Top electrodes 208 are disposed at an angle relative to an axis 220 along the length of slab 202. This angle is preferably between about 30 degrees and about 60 degrees. More preferably, this angle is between 35 degrees and 55 degrees, and 45 degrees is the most preferred value.

Similarly, bottom electrodes 210 are also disposed at an angle relative to axis 220. This angle is preferably between about 30 degrees and about 60 degrees. More preferably, this angle is between 35 degrees and 55 degrees, and 45 degrees is the most preferred value.

Preferably the length by height edges and length by width edges of slab 202 are passivated.

As shown in more detail on later figures, the detector also includes processing electronics connected to the top and bottom electrodes and configured to receive analog charge signals from these electrodes. The use of analog signals is important for improving position resolution via charge cloud reconstruction as described below.

Figure 3A:
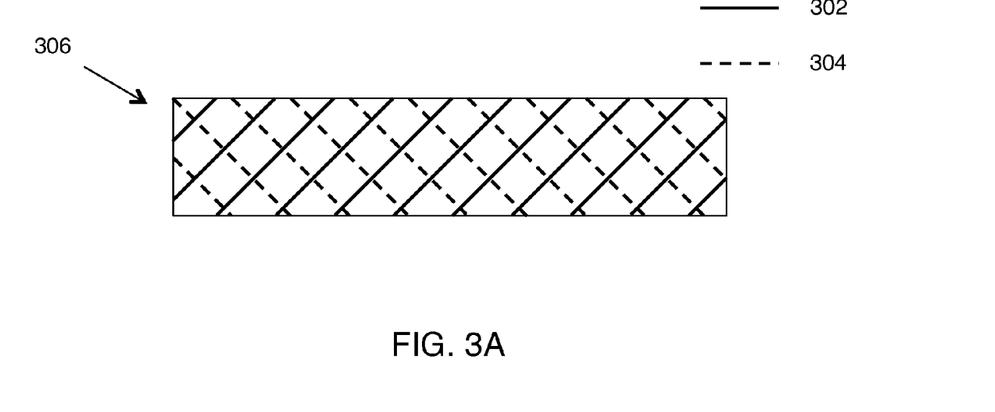
FIGS. 3A-B show further aspects of embodiments of the invention.
Figure 3B:
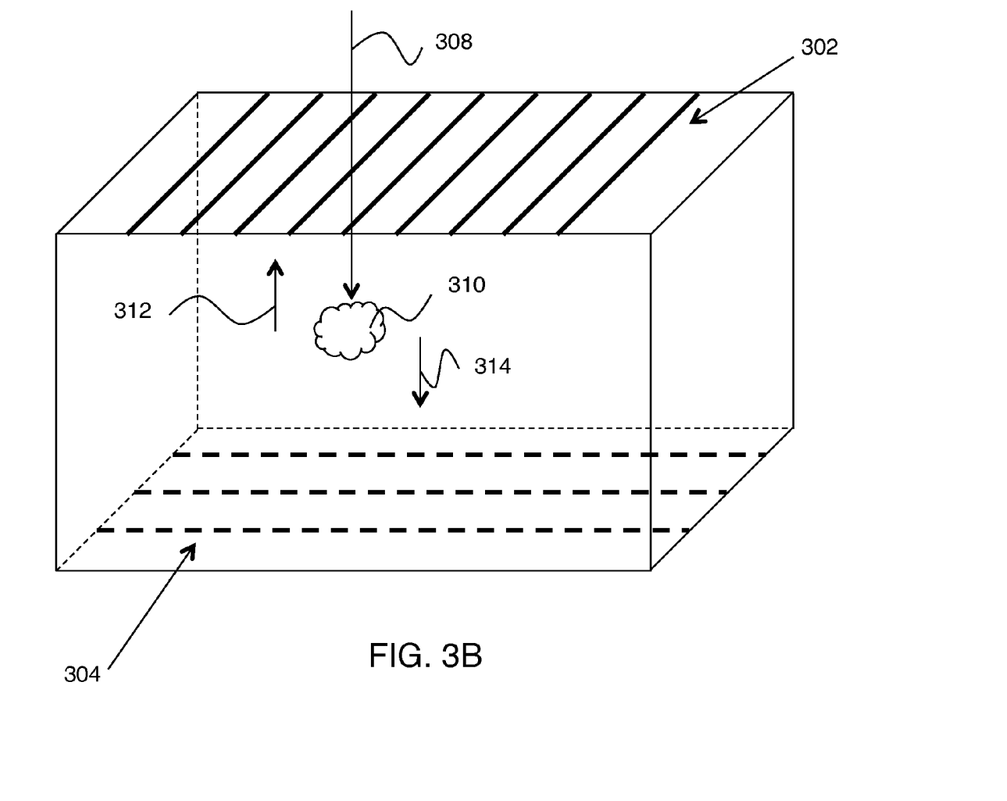

FIGS. 3A-B show further aspects of embodiments of the invention. In many cases, it is desirable for the detector to be configured as a relatively long narrow strip, as shown on FIG. 3A. Preferably the detector slab length is greater than the slab width by a factor of 2 or more. It is convenient to use the sketch of FIG. 3A to schematically represent detectors according to embodiments of the invention. Here 306 is the detector, 302 refers to the top electrodes (solid lines) and 304 refers to the bottom electrodes (dashed lines).

The basic operating principle of detectors as described above is shown on FIG. 3B. For convenience, on this figure only, the electrodes are shown as being parallel and perpendicular to the slab edges. An incident photon 308 give rise to a charge cloud 310 when it is absorbed. Because of the electrical bias in the detector, electrons and holes travel in opposite directions toward top and bottom electrodes 302 and 304, as shown by arrows 312 and 314. The resulting signals at two or more of the top electrodes and two or more of the bottom electrodes can allow the lateral position of charge cloud 310 to be determined in both lateral directions because of the cross-strip electrode geometry. When a charge cloud is created in the semiconductor, electrons and holes migrate to the respective collecting anodes following the field lines and, due to diffusion processes that cause the charge cloud to expand, a signal is detected on multiple strips. To permit charge cloud reconstruction, a signal must be detected on at least two strips per side. Charge cloud size and strip pitch can be matched such that two strips on each side measure part of the signal. By interpolation between the strips the interaction position of the photon can be determined.

More specifically, the detector can be configured to provide charge cloud reconstruction of X-ray detection events in the semiconductor slab from signals received at two or more of the top electrodes and received at two or more of the bottom electrodes. The charge cloud reconstruction can be performed by fitting a charge cloud model to signals from the electrodes. Alternatively, the charge cloud reconstruction can be performed by maximum likelihood estimation based on signals from the electrodes. The detector can be configured to measure photon energy by measuring the total charge from a photon event.

The detector can be configured to provide relative timing information for signals detected at the top electrodes relative to signals detected at the bottom electrodes. The relative timing information can be used to associate signals detected at the bottom electrodes to corresponding signals detected at the top electrodes such that the corresponding signals are from individual X-ray detection events. In other words, timing information can be used to determine which signals from the top electrode 'go with' which signals from the bottom electrodes. The relative timing information can also be used to determine a height at which an X-ray detection event occurred in the semiconductor slab.

Relevant factors for understanding the initial charge cloud distribution include detailed energy-loss mechanisms for electrons: electron-phonon interaction; valence band ionization; excitation of plasmons and decay; core shell ionization (K and L-shell); shake-off electrons; Bremsstrahlung emission energy loss; and band structure effects in the semiconductors. The spatial distribution of electron-hole pairs at the primary production stage is important to fundamental understanding of electron-hole annihilation, trapping in defects, and recombination of excited carriers. From the literature, it is known that the track structures produced by high-energy electrons are not a linear (or Gaussian) distribution, but form a number of blobs along both the z (direction of incident photon) and lateral (perpendicular to direction of incident photon) directions). This finding has also recently been supported by other works where it was found that a model of 'line and blob' better predicted the response of their segmented Si detector in the presence of charge sharing. Given that we hope to 'track' or 'reconstruct' the charge cloud distribution from our measurements, accurate prediction of the initial charge cloud distribution is important.

Another important factor to consider is the model of the depleted Si material, and the bias field distribution for a range of geometric parameters: Si thicknesses (10 μm to 2 mm), microstrip lengths (5 mm to 5 cm), microstrip spacings (20 μm to 200 μm) and microstrip widths (10 μm to 200 μm minimum up to max depending on spacing). Simulation can be used to study the sensitivity of the electric field distribution to process variation (e.g. non-uniformity in doping concentration), including X-ray dose-dependent leakage and charge trapping/de-trapping models, and parasitic channel effects. Of particular concern is the performance of the basic detector unit along each of the cut edges of the Si slab, where passivation is difficult to achieve. Field shape in this region can be modeled to determine if custom modifications to the manufacturing process in combination with changes to the microstrip geometry can be used to maintain sensitivity up to the edges of the detector. A standard weighting fields model for charge propagation can be used to calculate the final signal detected on each microstrip as a function of depth of interaction of the x-ray photon and location in x-y relative to the microstrip. The trajectory of the drifting charges can be calculated by following an imaginary point charge, step by step, through the electric field. The impact of location of interaction, pulse shaping, readout noise, and capacitance can be included to determine the spatial and energy accuracy of the measured signal.

The simplest approach for charge cloud reconstruction is to make an assumption about the charge cloud shape, and to fit the measured data to an appropriate function to calculate the center of gravity of the cloud. Some shape options include rectangular, Gaussian, hyperbolic cosine, parabolic or Lorentzian. The accuracy of centroid tracking for fits using four (2 per side), 6 (3 per side) and 8 (4 per side) strips can be investigated as a function of charge cloud size or equivalently x-ray energy. Note that as the number of strips recording the same event increases, the achievable count rate decreases. The accuracy of charge tracking will also depend on the noise in each measurement, as well as on the chosen threshold above which a signal is recorded. Proper selection of the threshold value is important for imaging performance. The value of the threshold can be a fixed number (e.g. upper limit of the electronic noise) or can be a floating value (e.g. proportional to the total value of the charge collected on each strip). Note that some non-linearity in charge division between strips should be expected since the initial charge cloud is much smaller than the interstrip distance, and thus when a photon interacts very close to one strip, the signal on that strip is disproportionately large.

The parameter η (Eq. 1) describes the non-linearity—it is the ratio of signal on the right-hand strip $S_R$ to the sum of the signal on both strips.

$$\eta = \frac{S_R}{S_R + S_L} \quad (1)$$

This parameter can be measured for a given microstrip geometry, and since photons are uniformly distributed, a non-linear weighting based on the differential of the distribution can be applied (as in Eq. 2 below) to more accurately locate each charge cloud.

$$x_\eta = P \frac{\int_0^{\eta_0} \frac{dN}{d\eta} d\eta}{\int_0^1 \frac{dN}{d\eta} d\eta} = Pf(\eta_0) \quad (2)$$

Alternative Approach: Since previous work has shown that simple Gaussian assumptions are not sufficient for energies above ~20 keV we also consider an iterative expectation maximization framework to produce the best image reconstruction in the statistical sense. One possibility follows the list-mode approach of PET reconstruction, which was applied to improve spatial resolution in early semiconductor-based gamma detectors. In our case, list-mode data consist of a list of strip charge measurements ($g_j$ for each x-ray photon, j=at least 4) for each interacting x-ray photon. The log-likelihood of measuring signal f on a 'subpixel' is described by Eq. 3, and the iterative expectation maximization approach (Eq. 4) can be used to solve for the most likely set of sub-pixel values given the strip charge measurements, and knowledge of $S_i$, the local (measured) sensitivity of the detector for x-ray photons interacting at position i.

$$L = \ln p(g_1, g_2, \ldots, g_N) = \sum_{j=1}^{N} \ln p(g_j | f) \quad (3)$$

$$\hat{f}_k^{(t+1)} = \hat{f}_k^{(t)} \sum_{j=1}^{N} \frac{p(g_j | k)}{\sum_{i=1}^{M} p(g_j | i) \hat{f}_i^{(t)} S_i} \quad (4)$$

Simulations can be used to build depth and energy-dependent probability density functions (PDFs) which can further constrain the model. While computationally expensive, the list-mode data will be available, and additional non-idealities such as K X-rays and Compton scattering could be included in the PDF model, thereby (potentially) enabling accurate reconstruction for higher-energy x-rays and for other materials.

The achievable resolution and efficiency can be estimated by combining a Monte Carlo model of x-ray interaction in Si with the model of charge cloud creation and migration into a single simulation pipeline. This can permit accurate prediction of detector operating characteristics for a range of design parameters (e.g., Si thickness, microstrip length, microstrip spacing), as well as including predicted performance specifications for readout circuit design. Of particular importance is to quantify the impact of signal loss and noise mechanisms including: 1. photons that interact close to boundaries of the Basic Detector Unit; 2. Compton and coherent scatter; 3. oblique photon path in Si; 4. pulse pile-up; 5. threshold choice; 6. noise due to parasitic capacitance.

As indicated above, an important feature of the present approach is the use of cross-strip electrodes that are at roughly 45 degrees with respect to the detector. There are several significant points associated with this geometry. The first point is that the cross-strip operating principle as shown on FIG. 3B is unaffected. The resulting position readout will be in 'electrode coordinates' which can readily be transformed to detector coordinates, if necessary, by a 45 degree coordinate rotation. Several advantages are also provided by this approach.

The first advantage can best be appreciated by considering a conventional cross-strip geometry for the detector of FIG. 3A. The electrodes along the length of the detector would be substantially longer than the electrodes along the width of the detector. This difference in electrode length is undesirable, because longer electrodes will have greater capacitance and accumulate more noise than shorter electrodes. This variance in electrode properties will undesirably complicate design. This shortcoming of the conventional cross strip geometry is overcome by the present approach, as seen on FIG. 3A. Here it is apparent that all electrodes have comparable length.

A second advantage of this geometry is that increasing the electrode segmentation intrinsically increases the count rate capability. In other words, smaller electrodes provide a higher count rate per unit area.

A third advantage of the present approach is that integration with detector electronics is facilitated. In particular, a conventional cross-strip detector as described above would require access to two orthogonal edges of the detector in order to make the required connections to detector electrodes for read out. In contrast, as described in greater detail below, the cross-strip detectors of this work can make all required electrical connections for detector readout via a single edge of the detector or via two parallel edges of the detector. This difference is especially significant when considering how to vertically stack and/or laterally combine cross-strip detector modules to make larger detector systems, as is often desirable to improve efficiency. X-rays are penetrating radiation, so increasing detector module thickness by stacking is often important for providing acceptable detection efficiency.

Figure 4A:
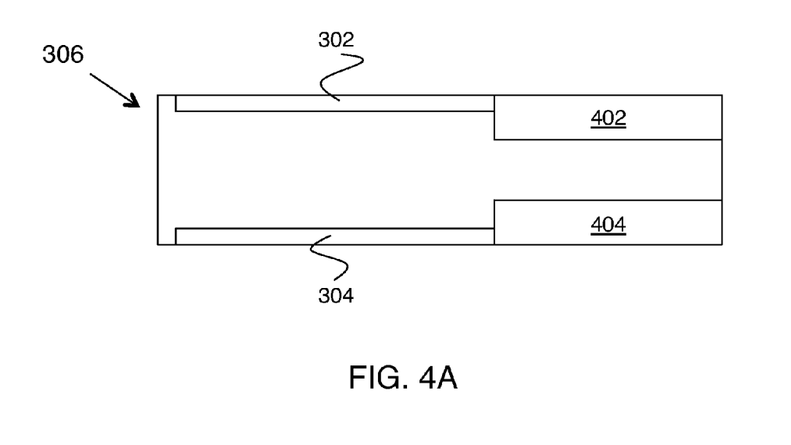
FIGS. 4A-B show two options for connecting readout electronics to embodiments of the invention.
Figure 4B:
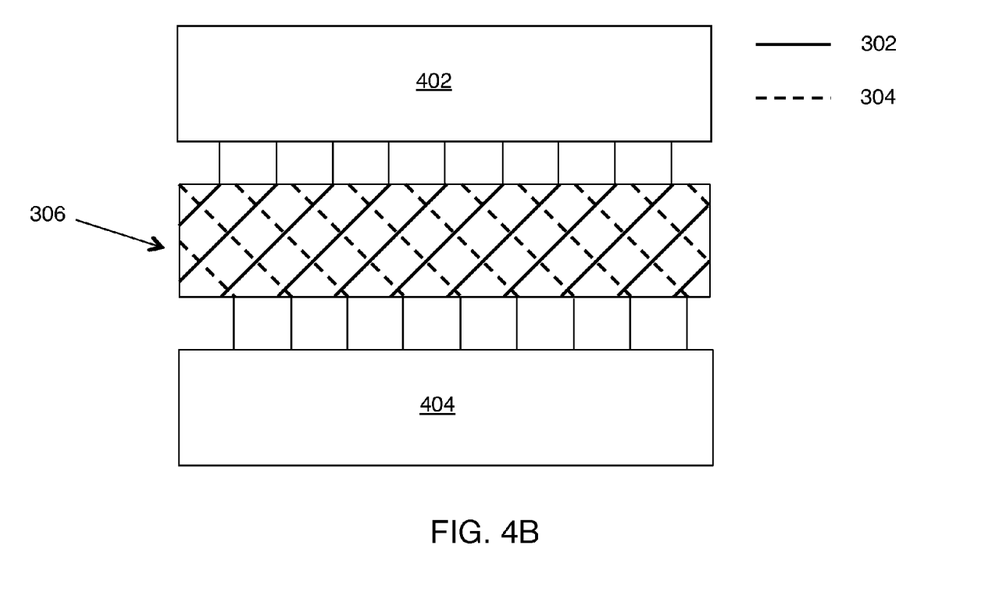

FIGS. 4A-B show two options for connecting readout electronics to embodiments of the invention. In the example of FIG. 4A, readout electronics 402 is connected to top electrodes 302 and readout electronics 404 is connected to bottom electrodes 304. Here all electrical connections to both the top electrodes and to the bottom electrodes are made on a single edge of the detector slab. FIG. 4B shows an alternative approach, where readout electronics 402 is connected to top electrodes 302 and readout electronics 404 is connected to bottom electrodes 304 on two parallel edges of the slab.

ASIC (application-specific integrated circuit) implementation optimized for such a detector would include a continuous time fast charge sensitive amplifier with a fast shaping time. In contrast to photon counters which identify a photon and simply count it, our approach will detect the signal from the photon on multiple strips and store the measured signal heights and arrival times into an analog FIFO memory. The resulting output data of amplitude and time information from multiple channels will be aggregated and multiplexed out from the ASIC. In one exemplary design using a 50 μm strip separation, the Basic Detector Unit could be 10 mm wide and 20 cm long (4096 channels per sensor side) at up to 2 Mcps/mm$^2$. This detector unit would generate a raw data rate of 8.5 GSamples/s or ca. 16 Gbytes/s. A 10-layer system with optimized sensor thicknesses would enable the detection of 20 Mcps/mm$^2$.

Figure 5:
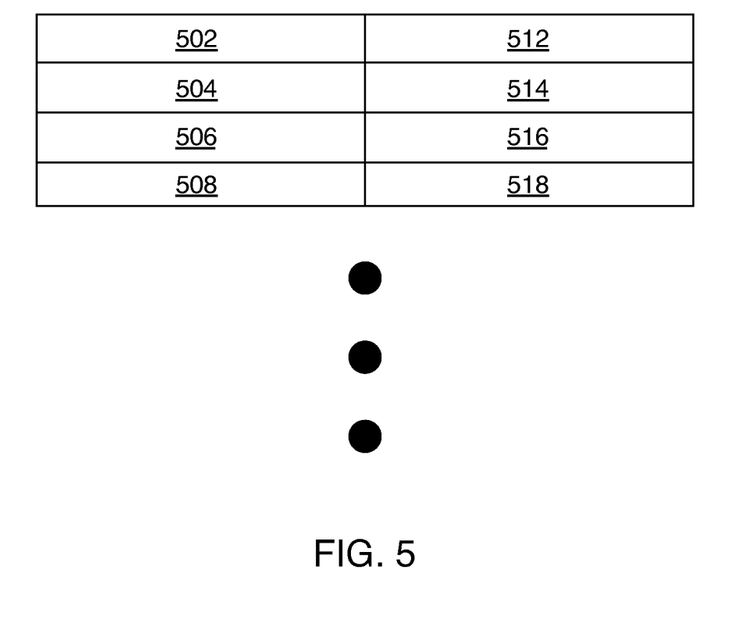
FIG. 5 shows vertical stacking of detector modules.

As indicated above, stacking of detector modules is often important for increasing detector efficiency. The present approach is well-suited for such integration. FIG. 5 shows an example of vertical stacking of detector modules to increase total height. Here 502, 504, 506 and 508 are cross-strip detector slabs, and 512, 514, 516, and 518, respectively, are the corresponding readout electronics. Here it is apparent that such integration can be made simpler if the readout electronics only needs access to a single edge of the detector slab, as described above.

FIGS. 6A-B show two approaches for providing a curved detector geometry. Providing such a geometry is often desirable for increasing resolution by making the detector more nearly orthogonal to incident X-rays over its area. One approach is for the detector slab itself to be curved, e.g., slab 602 of FIG. 6A. Another approach is to arrange several planar detector modules to provide a piecewise linear approximation to a curved detector geometry, as shown by detector modules 604, 606, and 608 on FIG. 6B.

Some considerations relating to an exemplary design follow. In this example, the Si Basic Detector Unit is 500 μm thick, with a microstrip width of 30 μm and an inter-strip distance of 50 μm to provide the expected resolution of 5 μm at 25 keV. Each Basic Detector Unit will require 4 ASICs (two on the top, two on the bottom) to provide a total detector size of ~10 mm (limited by microstrip capacitance and resulting noise)×9.6 mm (limited by ASICs). At 25 keV, the quantum detection efficiency of the two-layer detector will be ~46%, and should have flat DQE out to spatial frequencies above 100 cycles/mm. The uncertainty in location of interaction due to obliquity of rays through the 500-micron thick basic detector unit at the edge of a 1-cm× 1-cm detector, will be 2.5 μm and 5 μm for source-to-detector distances of 1 m and 0.5 m respectively.

The invention claimed is:

1. An X-ray detector comprising:
a semiconductor slab having a length, a width and a height, wherein the slab is configured to be electrically biased across its height;
four or more microstrip electrodes, wherein the microstrip electrodes are configured as two or more first microstrip electrodes disposed parallel to each other on a first surface of the semiconductor slab, and two or more second microstrip electrodes disposed parallel to each other on a second surface of the semiconductor slab opposite the first surface; and
processing electronics connected to the microstrip electrodes and configured to receive analog charge signals from the microstrip electrodes;
wherein the first microstrip electrodes and the second microstrip electrodes are separated by the height of the semiconductor slab;
wherein the first microstrip electrodes are substantially orthogonal to the second microstrip electrodes;
wherein the first microstrip electrodes are disposed at an angle relative to an axis along the length of the semiconductor slab between about 30 degrees and about 60 degrees;
wherein the second microstrip electrodes are disposed at an angle relative to the axis along the length of the semiconductor slab between about 30 degrees and about 60 degrees.

2. The X-ray detector of claim 1, wherein the length is greater than the width by a factor of 2 or more.

3. The X-ray detector of claim 1, wherein the first microstrip electrodes and the second microstrip electrodes are disposed at an angle relative to each other between about 80 degrees and about 100 degrees.

4. The X-ray detector of claim 1, wherein the first microstrip electrodes is disposed at an angle relative to an axis along the length of the semiconductor slab between about 35 degrees and about 55 degrees, and wherein the second microstrip electrodes is disposed at an angle relative to the axis along the length of the semiconductor slab between about 35 degrees and about 55 degrees.

5. The X-ray detector of claim 1, wherein the detector is configured to provide charge cloud reconstruction of X-ray detection events in the semiconductor slab from signals received at two or more of the first microstrip electrodes and received at two or more of the second microstrip electrodes.

6. The X-ray detector of claim 5, wherein the charge cloud reconstruction is performed by fitting a charge cloud model to signals from the microstrip electrodes.

7. The X-ray detector of claim 5, wherein the charge cloud reconstruction is performed by maximum likelihood estimation based on signals from the microstrip electrodes.

8. The X-ray detector of claim 1, wherein the detector is configured to measure photon energy by measuring the total charge from a photon event.

9. The X-ray detector of claim 1, wherein the detector is configured to provide relative timing information for signals detected at the first microstrip electrodes relative to signals detected at the second microstrip electrodes.

10. The X-ray detector of claim 9, wherein the relative timing information is used to associate signals detected at the second microstrip electrodes to corresponding signals detected at the first microstrip electrodes such that the corresponding signals are from individual X-ray detection events.

11. The X-ray detector of claim 9, wherein the relative timing information is used to determine a height at which an X-ray detection event occurred in the semiconductor slab.

12. The X-ray detector of claim 1, wherein length by height edges and length by width edges of the semiconductor slab are passivated.

13. An X-ray detector comprising two or more X-ray detectors of claim 1, wherein the X-ray detectors of claim 1 are stacked to increase total height.

14. The X-ray detector of claim 1, wherein the semiconductor slab is curved.

15. An X-ray detector comprising two or more X-ray detectors of claim 1, wherein the X-ray detectors of claim 1 are disposed to increase total length and are disposed to provide a piecewise linear approximation to a curved detector geometry.

16. The X-ray detector of claim 1, wherein all electrical connections to the first microstrip electrodes and to the second microstrip electrodes are made on a single edge of the slab.

17. The X-ray detector of claim 1, wherein all electrical connections to the first microstrip electrodes and to the second microstrip electrodes are made on two parallel edges of the slab.

* * * * *